(12) United States Patent
Grebner et al.

(10) Patent No.: US 7,834,756 B2
(45) Date of Patent: Nov. 16, 2010

(54) FAILURE CURRENT MEASUREMENT FOR ELECTRONIC CONTROL MODULE

(75) Inventors: Klaus-Dieter Grebner, Markt Rodach (DE); Volker Marr, Ebersdorf (DE)

(73) Assignee: Lear Corporation GmbH, Ginsheim-Gustavsberg (DE)

( * ) Notice: Subject to any disclaimer, the term of this patent is extended or adjusted under 35 U.S.C. 154(b) by 283 days.

(21) Appl. No.: 12/051,141

(22) Filed: Mar. 19, 2008

(65) Prior Publication Data

US 2008/0238707 A1    Oct. 2, 2008

(30) Foreign Application Priority Data

Mar. 29, 2007    (DE)    ........................ 10 2007 015 291

(51) Int. Cl.
*G08B 29/00*    (2006.01)
*B60Q 1/00*    (2006.01)
*B60G 17/0185*    (2006.01)

(52) U.S. Cl. .................. 340/509; 340/506; 340/507; 340/508; 340/510; 340/438; 701/34; 701/39

(58) Field of Classification Search ................ 340/506, 340/507, 508, 510, 509
See application file for complete search history.

(56) References Cited

U.S. PATENT DOCUMENTS

| | | | |
|---|---|---|---|
| 4,394,655 A * | 7/1983 | Wynne et al. | 340/825.36 |
| 4,752,698 A * | 6/1988 | Furuyama et al. | 307/116 |
| 5,721,530 A * | 2/1998 | Right et al. | 340/521 |
| 5,936,520 A * | 8/1999 | Luitje et al. | 340/517 |

* cited by examiner

*Primary Examiner*—Donnie L Crosland
(74) *Attorney, Agent, or Firm*—Brooks Kushman P.C.

(57) ABSTRACT

A method and system for assessing or otherwise determining defective operation of an electronic control unit (ECU). The ECU may be a vehicle or non-vehicle ECU having any number of modules configured to provide and/or support any number of operations. The defective ECU operations may be determined as a function of a voltage drop across a shunt included on the ECU.

20 Claims, 1 Drawing Sheet

FAILURE CURRENT MEASUREMENT FOR ELECTRONIC CONTROL MODULE

CROSS-REFERENCE TO RELATED APPLICATIONS

This application claims priority to German Application No. 10 2007 015 291.6, filed on Mar. 29, 2007, the disclosure of which is hereby incorporated in its entirety.

BACKGROUND OF THE INVENTION

1. Field of the Invention

The present invention relates to current measurements associated with an electronic control module (ECU), such as but not limited to current measurements occur during sleep mode operation of the ECU.

2. Background Art

The functionality and the complexity of a vehicle or other device requiring an electronic control module (ECU) are continuously increasing. With additional devices needing electronic control and related operations, the number of ECUs on the vehicles, as well as the necessary wiring and costs to support the corresponding operations, are rising.

Examples to manage the costs as well the system complexity may include ECU networking via bus systems (virtual sensory, distributed intelligence and functions), increasing integration of the ECUs (more functions per ECU), and/or replacing relays with power semiconductors. This cost management, however, generally results in the need for a bus to facilitate controlling ECUs, which requires the ECUs and the modules that they control to be constantly powered in order to receive bus signals.

The ECUs may operate in active and inactive state. The active state corresponds with the ECU being normally powered and fully operation of the modules. The inactive state, commonly referred to as sleep mode, corresponds with the ECU be minimally powered such that the modules are inactive but provided with a minimal current so as to facilitate receipt and operation in response to the bus signals.

As one skilled in the art will appreciate, the modules and other features of the ECU may defective, either at the time of installation or thereafter, for any number of reasons, such as but not limited to ESD, mechanical stress, internal/external corrosion and/or any number of other influences. The defects when the ECU are active are easily detectable by the loss or inoperability of the function associated with the defective module. Defects not associated with loss of the modules or during sleep mode when the modules are inactive are not detected, typically at least until the module fails or the ECU is activated.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
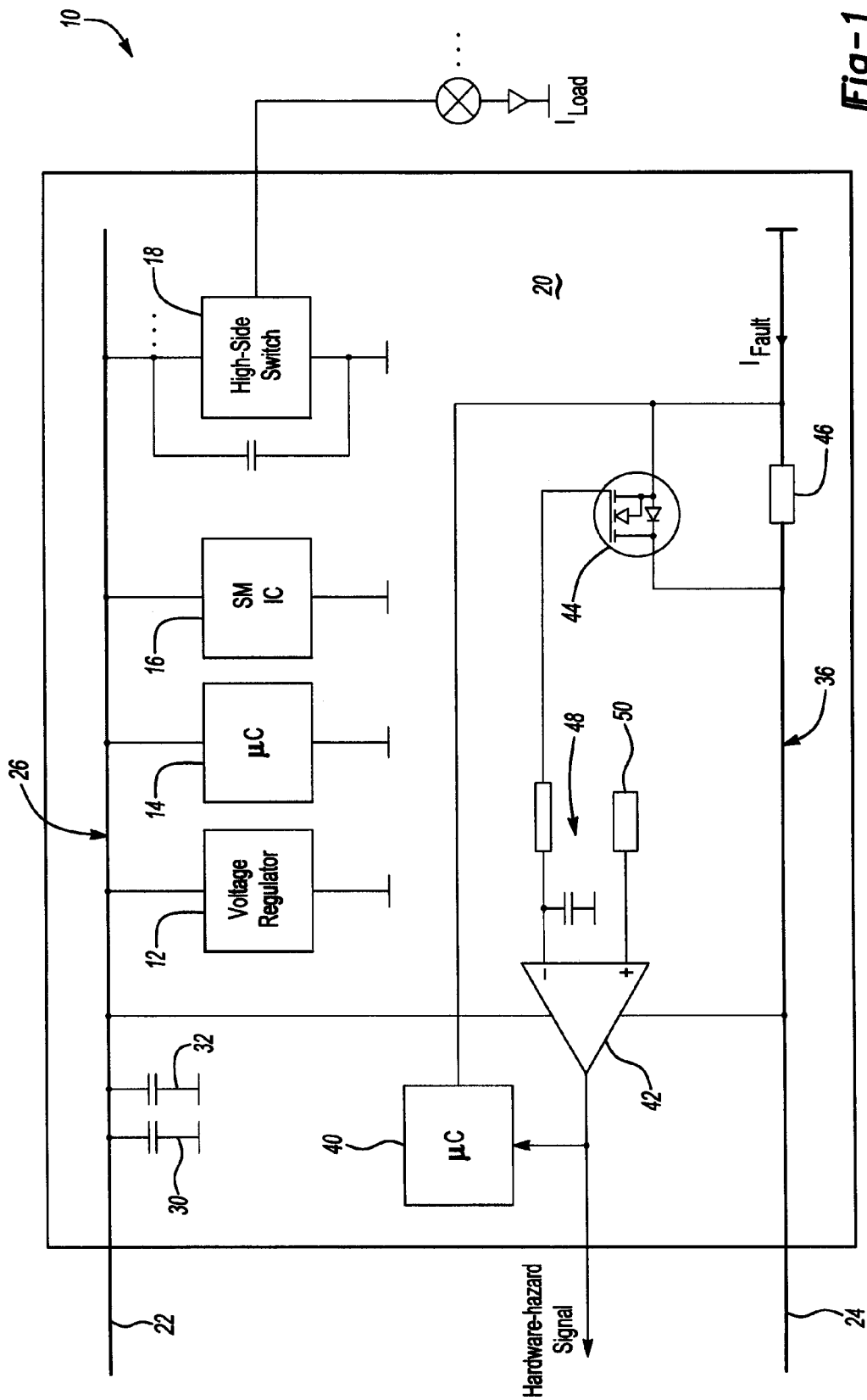
FIG. 1 illustrates an electronic control unit (ECU) for a vehicle in accordance with one non-limiting aspect of the present invention.

FIG. 1 illustrates an electronic control unit (ECU) 10 for a vehicle in accordance with one non-limiting aspect of the present invention. The ECU 10 may include a number of modules 12-18. The modules 12-18 may themselves be controllers or other functioning elements having capabilities to control and/or direct any number of operations associated with vehicle subsystem operations. While FIG. 1 illustrates a vehicle related ECU 10, the present invention is not so limited and fully contemplates the ECU 10 being associated with non-vehicle applications and other devices.

The ECU 10 may include any number of modules and is shown for exemplary purpose and without intending to limit the scope and contemplation of the present invention to include a voltage regulator module 12, a microcontroller module 14, a stepper motor module 16, and a high side switch 18. Each of these modules may be used to control another one of the modules 12-18, a vehicle subsystem, and/or to perform any number of other operations. The modules 12-18 may be included on printed circuit board (PCB) or other electrically conducting medium 20 for connecting the modules and other PCB components to a vehicle battery 22 and vehicle ground 24.

The voltage regulator 12 may be configured to regulate internal ECU voltage on a ECU power bus 26 used to power one or more of the other modules 12-18 with a stabilized voltage. One or more capacitors 30-32 may also be include facilitating filtering and smoothing the battery voltage regulated by the voltage regulator 12. The microcontroller 14 may be used to control operations of the ECU 10 and/or operations of other elements requiring logical processing, whether such element are included on the PCB 20 or in remote communication therewith. The stepper motor 16 may be used to control motor operations of vehicle subsystems, such as but not limited to control seat motors, door motors, etc. The switch 18 may be use to connect various vehicle systems, shown as a load, to power, such as to facilitate power head lamps, air conditioning, entertainment systems, etc.

The modules 12-18 may be connected between the ECU power bus 26 and an ECU ground bus 36. The ECU power bus 26 receives power directly from a battery or other vehicle power source for distribution to one or more of the modules 12-18. The ECU ground bus 36 may be used for connecting the PCB ground side of the modules 12-18 to the vehicle ground 24. In this manner, the PCB 20 may include a common power input and a common ground output. Energy used to power the ECU 10, and its associated modules 12-18 and components, may flow from the vehicle battery, over the ECU power bus 26, through the modules 12-18, to the ECU ground 36, and on the vehicle ground 24.

The ECU 10 may include a second microcontroller 40, a comparator 42, a transistor 44, and a shunt 46. These, and/or other, components may be utilized in accordance with the present invention to facilitate ECU current measurement. As described below in more detail, the ECU current measurement may take place while the ECU 10 is in a sleep mode, and thereby, facilitate fault detection while the ECU 10 is generally inactive. The microcontroller 40 is shown as a standalone feature but it or its functionality may integrated with the other microcontroller 14 and/or one of the other modules or features of the ECU 10.

The ECU 10 is generally considered to be in an active mode when the vehicle is operational, either for driving or power on related operations (ignition on but engine or other drive system off). These conditions correspond with operational power being supplied to the modules 12-18 such that the modules 12-18 are able, assuming the modules 12-18 are properly operation, to execute their intended operations.

The ECU 10 may be considered to be in inactive mode, commonly referred to as sleep mode, when minimally powered such that the modules 12-18 are inactive but provided with a minimal current so as to facilitate receipt and operation in response to the bus signals. For example, sleep mode mean that the current consumption of the vehicle goes down to a value which can be supplied by the battery over a certain time, optionally with all ECUs which are powered directly have to drive down their current consumption. Mainly only signal sensing (from sensors or busses like CAN) may be active.

Even during sleep mode, the ECU 10 may be powered with a minimal amount of current, such as 100 mA or some other value, which may be continuously or intermittently supplied. This minimal current, however, is insufficient with respect to supporting typically ECU operating capabilities available to the ECU 10 during active mode.

As one skilled in the art will appreciate, the modules and other features of the ECU may defective, either at the time of installation or thereafter, for any number of reasons, such as but not limited to ESD, mechanical stress, internal/external corrosion and/or any number of other influences. The defects when the ECU are active are easily detectable by the loss or inoperability of the function associated with the defective module. Defects not associated with loss of the modules or during sleep mode when the modules are inactive are not detected, typically at least until the module fails or the ECU is activated.

The defects not associated with module loss during active mode or the defects occurring during sleep mode, whether detectable upon returning to active mode or not, may be detected in accordance with the present invention. In more detail, one non-limiting aspect of the present invention generally corresponds with detecting such defects as a function of ECU current, which allows the present invention to detect such hazardous conditions during active or sleep modes, optionally without having to wake up or otherwise active the components out of sleep mode.

The ECU current may be measured in accordance with the present invention based on current received at the ECU ground bus 36. As shown, the shunt 46 may be included between the ECU ground 36 and the vehicle ground 24. During active operation, the microcontroller 40 may control the transistor 44, which may be any other suitable controllable switch, to short the shunt 46 such that current carried over the ECU ground bus 26 bypasses the shunt 46 and is carried onto the vehicle ground bus 24 in order to eliminate the voltage drop across the shunt 46.

The controller 40 may control the transistor 44 to open, causing current to flow through the shunt 46 prior to reaching the vehicle ground 24. The voltage drop across the shunt 46 may be measured to determine ECU current and assess fault conditions. The controller 40 may switch between providing current to the ground bus 36 by way of the shunt 26 or by way of bypassing shunt 26, either during sleep mode or active mode. In this manner, the present invention contemplates detecting module or other ECU defects as a function of the voltage drop across the shunt 26.

The comparator 42 may compare the voltage drop across the shunt 26 associated with normal mode conditions against the current voltage drop. If the current voltage drop is greater than the normal threshold, the comparator 42 may output a signal indicative of the corresponding fault condition. The comparator 42 may include a fixed threshold and/or a variable threshold, optionally controlled by the controller 40, to assess acceptable and unacceptable voltage levels depending on whether the ECU 10 is operating in active mode or sleep mode.

The signal from the comparator 42, which may indicate a defect or no defect, may be communicated to another system on the vehicle and/or another element on ECU 10 to facilitate corrective action. Optionally, during active and/or inactive modes, the controller 40 may shutdown one or more of the modules 12-18 and/or prevent one or more of the modules 12-18 from waking up, in response to defective ECU operations being determined from the shunt voltage. Any changes in the current of the ECU 10, therefore, can be detected and measured as a function of the corresponding voltage across the shunt 46. This allows the present invention to measure ECU current while in the ECU 10.

The increase in ECU ground current during mode may be attributed to any number of fault conditions with the PCB 20 or modules 12-18 included therein. As one skilled in the art will appreciate, the variety and scope of such conditions does not require explanation, other than to assume that such faults result in an increase in ECU ground current. The ability to detect this increase during sleep mode can be helpful in generating a warning and/or facilitate corrective action before returning to the active mode.

The comparator 42 may include a smoothing/filter circuit 48 to smooth the input signal from the shunt 46. The comparator 42 may include reference voltage 50 for comparison with the shunt 46. The reference voltage 50 ay be changed and/or adapted as a function of the modules 12-18 in order to adjust to the type and quantity of modules include on the ECU 10. The components facilitating the ECU current measurement of the present invention may be relatively low cost components included on the PCB 20 with a relatively insignificant impact of system cost. The present invention fully contemplates any number of configurations to support and facilitate the contemplated ECU current measurement.

While the comparator 42 may be substituted for with other more complex and/or logically functioning elements, the relatively simple operation of the comparator 42 and its correspondingly low cost may be preferred. The functionality of the comparator 42, however, may be somewhat limited to binary operations where it may only indicate the presence or absence of a fault condition, as it may be unable to distinguish the source causing the increase is sleep mode current. The controller 40, however, may be configured to switch one or more of the modules 12-18 on and off so as to facilitate isolating the defective source, even during binary comparator 42 operation, based on the corresponding voltage drops. This may further require varying the voltage threshold used by the comparator 42 to correspond with the active and inactive modules 12-18. Optionally if additional system costs are permitted, additional comparators, switches, and shunts may be included to facilitate identifying the fault source, such as by associating the additional features with different portions of the ECU.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An electronic control unit (ECU) having a number of modules mounted on a printed circuit board (PCB), the PCB having a power bus and a ground bus, each of the modules being electrically connected in parallel between the power bus and the ground bus, the ECU comprising:
   an output for distributing current carried over the ground bus from the ECU, the current corresponding with total current flow through the modules;
   a shunt connected between the modules and the output; and
   a controller mounted on the PCB, the controller configured to assess defective ECU operations as a function of a voltage drop across the shunt.

2. The ECU of claim 1 further comprising a bypass connected in parallel with the shunt, the bypass being controllable by the controller to bypass the shunt.

3. The ECU of claim 1 further comprising an input operable for connecting the power bus to a DC vehicle battery, the DC vehicle battery providing the current creating the voltage drop across the shunt.

4. The ECU of claim 2 wherein the controller controls the bypass so that current bypasses the shunt when the ECU is in an active mode.

5. The ECU of claim 2 wherein the controller controls the bypass so that the current to flows through the shunt when in a sleep mode.

6. The ECU of claim 1 comprising a comparator mounted to the PCB, the comparator configured to compare the shunt voltage to a threshold voltage and to output a defect signal when the shunt voltage is greater than the threshold voltage.

7. The ECU of claim 6 wherein the controller is configured to shutdown operation of one or more of the modules if the shunt voltage is greater than the threshold voltage.

8. The ECU of claim 6 wherein the controller is configured to control the threshold voltage.

9. The ECU of claim 1 wherein the controller is unable to detect which one of the modules is defective based solely on the voltage drop across the shunt.

10. The ECU of claim 9 wherein the controller controls one or more of the modules to become inactive in order to assess which one or more of the modules are defective.

11. The ECU of claim 1 wherein the modules are vehicle modules.

12. A vehicular electronic control unit (ECU) having a number of modules for controlling vehicle related operations, each module being mounted on the same circuit board, the ECU comprising:
   an input for commonly distributing power from a vehicle battery to an input side of the modules;
   an output for commonly distributing current from an output side of the modules to a vehicle ground;
   a shunt connected between the modules and the output for use in measuring a voltage drop associated with total current flow through the modules, the shunt being mounted to the circuit board; and
   a comparator configured to assess defective module operations as a function of the voltage drop across the shunt, the comparator being mounted to the circuit board.

13. The ECU of claim 12 further comprising a bypass for bypassing the shunt and a controller for controlling operation of the bypass such that the controller controls whether current flow to the output flows through or bypasses the shunt, the bypass being mounted to the circuit board.

14. The ECU of claim 12 wherein the comparator compares the shunt voltage to a voltage threshold to assess defective module operations.

15. The ECU of claim 14 wherein the threshold is varied depending on whether the modules are in active or inactive mode, the modules requiring more current when operating in active mode than in inactive mode.

16. The ECU of claim 14 wherein the comparator is unable to determine which one or more modules are defective.

17. A method determining defective ECU operations for an ECU having a number of modules, the modules receiving current from a common input and outputting current to a common output, the method comprising:
   measuring a voltage drop across a shunt connected between the modules and the common output while each of the modules are operating in a sleep mode and while each of the modules are operating in an active mode; and
   comparing the voltage drop measurement taken during active mode to an active mode threshold;
   comparing the voltage drop measurement taken during sleep mode to a sleep mode threshold; and
   without specifically identifying a defective module, determining there to be at least the defective module in the event at least of the voltage drop measurements exceeds the compared to threshold.

18. The method of claim 17, wherein each of the modules are mounted to the same circuit board, further comprising, after determining there to be the defective module, specifically identifying the defective module based on a plurality of voltage drops measured across the shunt while at least each one of the modules was separately prevented from consuming any current for at least one of the plurality of voltage drop measurements.

19. The method of claim 17 further comprising bypassing the shunt during active mode operations so as to prevent the voltage drop across the shunt.

20. The method of claim 17 further comprising controllably bypassing the shunt when the voltage drop is undesirable, and only determining defective ECU operations if current flows through the shunt, either during active or inactive modes of the ECU.

* * * * *